United States Patent [19]

Scherber et al.

[11] 4,148,294
[45] Apr. 10, 1979

[54] SOLAR COLLECTOR PANEL AND METHOD OF MAKING

[75] Inventors: Werner Scherber, Salem; Günther Dietrich, Daisendorf, both of Fed. Rep. of Germany

[73] Assignee: Dornier System GmbH, Friedrichshafen, Fed. Rep. of Germany

[21] Appl. No.: 786,443

[22] Filed: Apr. 8, 1977

[30] Foreign Application Priority Data

Apr. 15, 1976 [DE] Fed. Rep. of Germany ....... 2616662

[51] Int. Cl.² .................................................. F24J 3/02
[52] U.S. Cl. ..................................... 126/270; 126/271
[58] Field of Search ............. 126/270, 271; 73/355 R, 73/355 EM; 428/97, 469; 136/206, 89; 427/160, 373; 29/157.3 V; 204/29; 250/338, 495, 439 P; 237/1 A

[56] References Cited

U.S. PATENT DOCUMENTS

| 3,273,227 | 9/1966 | Pauls ................. 29/157.3 R |
| 3,328,275 | 6/1975 | Waterbury ................. 204/29 X |
| 3,390,672 | 7/1967 | Snelling ................. 126/270 |
| 3,891,447 | 6/1975 | Nordblom ................. 204/29 X |
| 3,920,413 | 11/1975 | Lowery ................. 126/270 |
| 3,985,116 | 10/1976 | Kapany ................. 126/271 |
| 4,005,698 | 2/1977 | Cuomo et al. ................. 126/270 |
| 4,026,267 | 5/1977 | Coleman ................. 126/270 |
| 4,067,315 | 1/1978 | Fehlner et al. ................. 126/271 |
| 4,117,829 | 10/1978 | Gross et al. ................. 237/1 A |

FOREIGN PATENT DOCUMENTS 513333 1/1976 Japan.

*Primary Examiner*—Carroll B. Dority, Jr.
*Assistant Examiner*—Larry Jones
*Attorney, Agent, or Firm*—Hans Berman

[57] ABSTRACT

A solar collector panel absorbing incident solar energy at a high rate while radiating only a small portion of the absorbed energy comprises aluminum or an aluminum alloy as a continuous metallic substrate carrying an anodized oxide layer not substantially thicker than 1 $\mu$. The exposed anodized surface is formed with a multiplicity of pores receiving nickel rods of microscopic dimensions which project from the oxide surface. When the pores are spaced apart 0.1 to 1 $\mu$ and have a diameter of 0.1 to 0.5 $\mu$, the nickel rods being dimensioned correspondingly, the panel has the desired properties.

6 Claims, 4 Drawing Figures

SOLAR COLLECTOR PANEL AND METHOD OF MAKING

This invention relates to solar collector panels and to a method of making the same.

The methods presently available for providing solar collector panels with surface coatings which impart to the panel surfaces high absorptance ($\alpha$) and low emittance ($\epsilon$) were reviewed recently at a symposium of the American Elektroplaters' Society (Industrial Finishing, 1976). A coating for aluminum, an otherwise valuable panel material, which would combine desirable values of $\alpha$ and $\epsilon$ with necessary stability at economically acceptable cost was not presented to the symposium.

It has now been found that such a coating can be produced at low cost on aluminum and alloys in which aluminum is the predominant component. A solar collector panel of this invention comprises a continuous metallic substrate of aluminum or aluminum alloy. An integral anodized layer covers a face of the substrate and has a thickness not substantially greater than 1 $\mu$. The layer, or at least its surface directed away from the substrate, is formed with a multiplicity of pores spaced apart 0.1 to 1.0 $\mu$ and having diameters of 0.1 to 0.5 $\mu$. A multiplicity of elongated metallic bodies are respectively received in the pores and project from the same outward of the anodized surface.

Microscopic nickel rods have been found to be most effective in producing a surface whose absorptance is close to that of a black body, but which emits very little energy because of its configuration. The free longitudinal ends of the nickel rods define a surface formed with recesses which transversely separate the rod ends. The projecting length of the rods and the depth of the recesses should average 1 to 5 $\mu$.

The afore-described panel is prepared by anodizing the aluminum or aluminum alloy substrate in an aqueous electrolyte until the porous oxide layer is formed, and by thereafter galvanically depositing the metal bodies, such as nickel rods, in the pores by making the substrate an electrode in an aqueous solution containing appropriate metal ions, such as nickel ions.

The porous oxide layer is formed quickly at approximately ambient temperature in an electrolyte of dilute phosphoric acid. The nickel deposit is preferably formed in a mildly acidic, conventional electrolyte by passing alternating current between the anodized substrate and the solution of nickel ions.

Aluminum and most of its alloys are distinguished by good heat conductivity so that a body of heat transmitting fluid is readily held in thermal contact with the substrate in a manner conventional in itself. The fluid may be caused to flow between the panel and a heat exchanger through a conduit, as is also known in itself.

Other features and many of the attendant advantages of this invention will readily be appreciated from the following detailed description of preferred embodiments when considered in connection with the attached drawing in which:

FIG. 1 diagrammatically illustrates the surface structure of a solar panel of the invention in cross section on a greatly enlarged scale;

Figure 1:
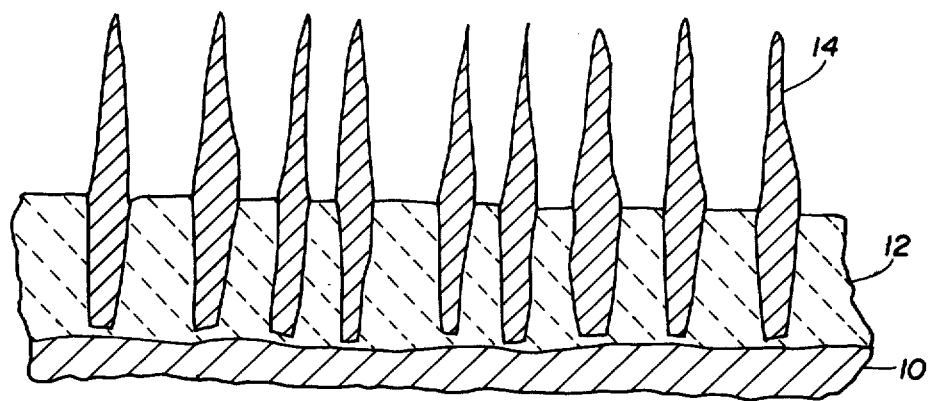

Referring initially to FIG. 1, there is seen a substrate 10 of commercially pure aluminum (aluminum 2 S) which is covered with an integral layer 12 consisting essentially of aluminum oxide. Pores in the oxide layer receive rods 14 of nickel which project above the oxide surface and are transversely spaced from each other. FIG. 1 is not drawn to scale, but the thickness of the oxide layer 12 may not be much greater than 1.0 $\mu$ and may be as small as 0.1 $\mu$. The pores and the conforming parts of the nickel rods 14 received in the pores have diameters of 0.1 to 0.5 $\mu$ and are spaced apart 0.1 to 1 $\mu$.

The freely projecting longitudinal ends of the rods are transversely offset from each other, and the aluminum oxide surface is exposed between the rods. The length of the rods is such that the surface defined by the ends of the rods and the aluminum oxide surface are spaced, on an average, 1 to 5 $\mu$.

Figure 2:
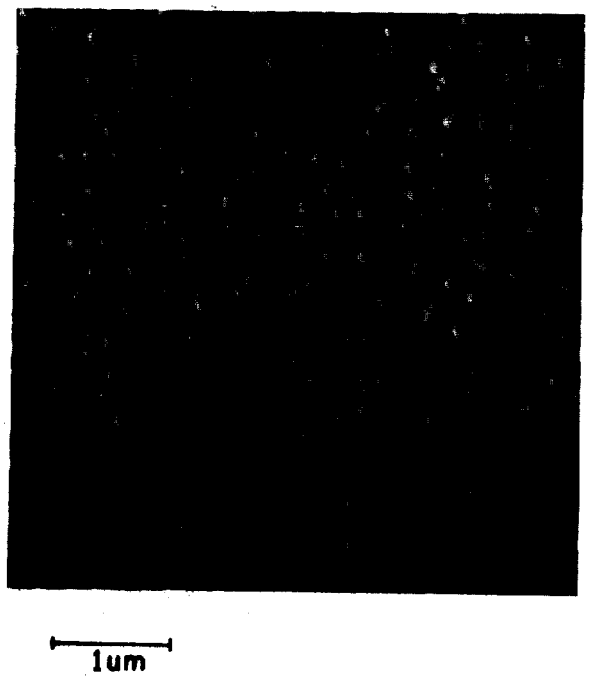
FIG. 2 is an actual photomicrograph of the exposed panel surface obtained by means of a scanning electron microscope.

The appearance of the coated substrate surface is velvet-like on a microscopic scale, as is evident from FIG. 2. The spacing of the individual rods 14 is too small to permit significant emission of radiant heat in the low frequency range of the infrared spectrum. In the high-frequency IR range (approximately 1 $\mu$), absorption and emission are equal, but thermal energy is radiated from the rods mainly at right angles to their surfaces, and only a small portion of each rod surface is directed outward of the panel.

Aluminum oxide emits radiant heat readily at 5 to 10 $\mu$, but such emission is suppressed by making the oxide layer very thin.

Figure 3:
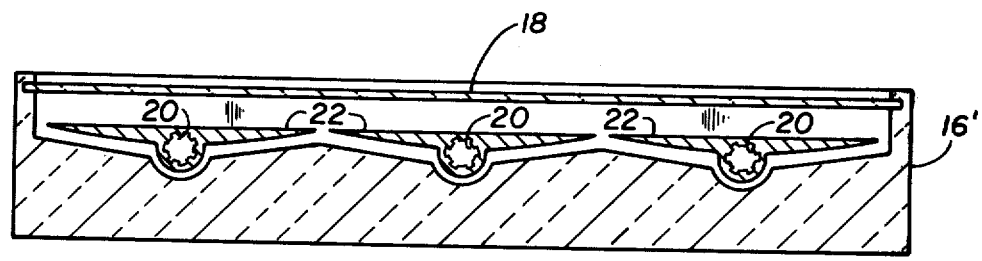
FIG. 3 shows a solar panel arrangement of the invention in elevational section.
Figure 4:
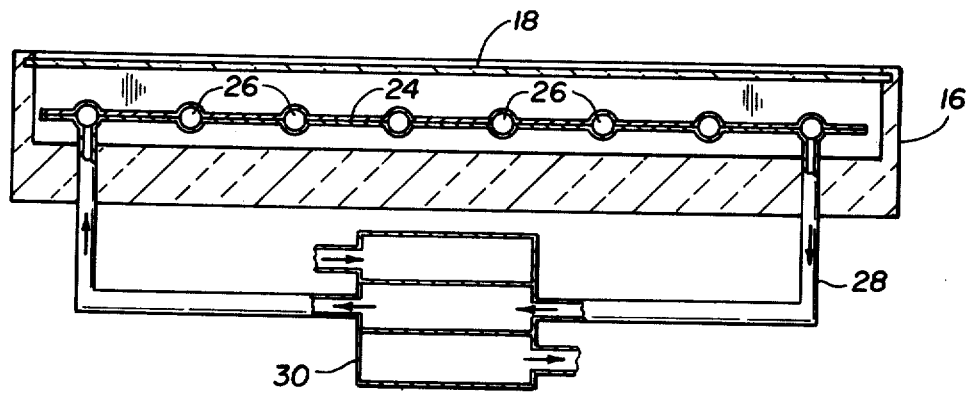
FIG. 4 illustrates another solar panel arrangement.

Basically conventional solar panel arrangements are shown in FIGS. 3 and 4. Each of the two arrangements includes a shallow box 16, 16' of thermally insulating material whose open top is closed by a glass plate 18. In the box 16 (FIG. 3), three internally ribbed heat pipes 20 are attached to the backs of juxtaposed aluminum sheets 22 which are elongated at right angles to the plane of FIG. 3 and mounted on the bottom of the box. The faces of the sheets 22 directed toward the glass plate 18 are anodized and nickel plated as described with reference to FIGS. 1 and 2. As is known in itself, the heat pipes 20 are filled with a fluid heat transfer medium, such as a low-boiling organic solvent. Solar heat evaporates the solvent, and the solvent vapors flow along the heat pipes into a heat exchanger in a known manner evident from FIG. 4. The heat of vaporization of the fluid is transferred there to water or other liquid, and the liquefied solvent is returned to the box 16 for renewed evaporation by solar energy.

The box 16' (FIG. 4) encloses a panel 24 which consists of two superimposed sheets of aluminum welded to each other in area contact and defining therebetween a meandering channel 26. Conduits 28 connect the two ends of the channel 26 to a heat exchanger 30. The fluid sealed in the circuit consisting of the channel 26, the conduits 28, and one part of the heat exchanger 30 is circulated by a thermal siphon effect or in any other desired manner to transfer solar energy from the panel 24 to another liquid which passes through the heat exchanger 30 in a conventional manner not specifically illustrated.

The face of the panel 24 directed toward the sun through the glass plate 18 of the box 16' is anodized and plated as shown in FIGS. 1 and 2.

The following Example illustrates a finishing method which readily produces the desired coating.

EXAMPLE

Two sheets of aluminum alloy 51 S were pressure-welded by the method of U.S. Pat. No. 3,273,227 to form the panel 24. The panel was carefully cleaned by brushing, the ends of the channel 26 were slugged, and one of the major faces of the panel was coated with a stop-off lacquer. The panel so prepared was further cleaned by immersion in an alkaline, aqueous cleaning bath having a slight etching effect, carefully rinsed free of cleaning solution, wired for current supply, and immersed in 15% (by weight) solution of phosphoric acid at 32° C. A potential of approximately 12 to 14 volts was applied for approximately seven minutes between the panel as the anode and a lead cathode. An initial current density of 3 amps./sq. dm dropped ultimately to 0.3 amps./sq.dm during anodizing. The thickness of the anodized coating was approximately 1 $\mu$.

The anodized panels were carefully rinsed in water until the washings became neutral, and then immersed in a solution at room temperature containing 50 g $NiSO_4.7H_2O$, 20 g $H_3BO_3$ and 2.5 ml glycerol per liter. An alternating potential of 8 volts was maintained between the panels and a nickel counterelectrode for 10 minutes. The anodized and nickel plated panels then were rinsed in several changes of cold water, sealed in water at 90° C., and ultimately airdried. The panel surface so produced appeared black to the naked eye, and a photomicrograph is shown in FIG. 2. The pointed ends of the rods appear rounded due to a sputtered gold deposit conventionally applied prior to photographic exposure.

The absorbtance value $\alpha$ for the finished surface was practically 100%, and the emittance value $\epsilon$ was below 10% for the temperature range from 60° to 100° C. which is of greatest practical importance at this time. Virtually the same result was achieved with other aluminum alloys containing magnesium and manganese as the principal alloying ingredients, but other aluminum alloys containing copper, silicon, chromium, and zinc were found also to be suitable.

A phosphoric acid electrolyte permits close control of pore size and pore spacing by varying acid concentration, temperature, applied voltgage and anodizing period, but preliminary tests indicate that sulfuric acid may also be employed although it requires more critical maintenance of operating variables. So far, we have not been able to duplicate the $\alpha/\epsilon$ ratio readily available in phosphoric acid by anodizing in sulfuric, oxalic, or chromic acid electrolytes.

It is usually more convenient to maintain an approximately uniform voltage between the electrodes in the anodizing cell during the brief period of electrolytic action. However, this is not critical, and a more uniform current may be maintained, if so desired, by increasing the voltage as the oxide film forming on the aluminum surface raises the resistance of the cell.

The mildly acidic nickel plating solution described above is known. It has been found to yield the desired nickel deposit without attacking the oxide film on the aluminum substrate when alternating current passes between the electrolyte and the porous aluminum oxide surface. The frequency of the alternating current is not important. It is not yet fully understood why nickel deposits produced by means of direct current, while feasible, do not produce an equally favorable ratio of $\alpha/\epsilon$ as the a.c. deposits. Agitation of the plating and anodizing solutions during current flow is not necessary and preferably avoided. It is equally unnecessary to agitate the panel serving as an electrode.

While the other transition metals of the iron group (Fe, Co), copper, tin and zinc can be electrodeposited from aqueous solutions of their sulfates on the anodized aluminum substrate, they are less effective than nickel in modifying the $\alpha/\epsilon$ ratio, and favorable effects initially observed decrease relatively fast. In the absence of expected significant other advantages, the alternate metal deposits were not yet investigated in detail.

It should be understood, of course, that the foregoing disclosure relates only to preferred embodiments of the invention, and that it is intended to cover all changes and modifications in the examples of the invention chosen herein for the purpose of the disclosure which do not constitute departures from the spirit and scope of the appended claims.

What is claimed is:

1. A panel capable of absorbing incident solar energy at a high rate and of radiating only a small portion of the absorbed energy, said panel comprising:
   (a) a continuous metallic substrate consisting predominantly of aluminum;
   (b) an anodized layer covering a face of said substrate and being integrally bonded thereto,
      (1) said layer consisting predominantly of aluminum oxide,
      (2) said layer having a surface directed away from said substrate and formed with a multiplicity of pores spaced apart 0.1 to 1 $\mu$ and having a diameter of 0.1 to 0.5 $\mu$; and
   (c) a multiplicity of elongated metallic bodies respectively received in said pores and longitudinally projecting outward of said surface.

2. A panel as set forth in claim 1, wherein said bodies essentially consist of nickel.

3. A panel as set forth in claim 2, wherein said surface is exposed between the projecting portions of said bodies.

4. A panel as set forth in claim 3, wherein the thickness of said layer is approximately 1 $\mu$.

5. A solar collector arrangement comprising a panel as set forth in claim 2, and fluid retaining means for holding a body of heat transmitting fluid in contact with said substrate.

6. An arrangement as set forth in claim 5, further comprising a heat exchanger remote from said panel, and a conduit connecting said fluid retaining means to said heat exchanger for flow of said fluid therebetween.

* * * * *